Aug. 26, 1969  J. G. WINKLER  3,463,849
METHOD OF INJECTION MOLDING FOOTWEAR
Filed Jan. 17, 1967  2 Sheets-Sheet 1
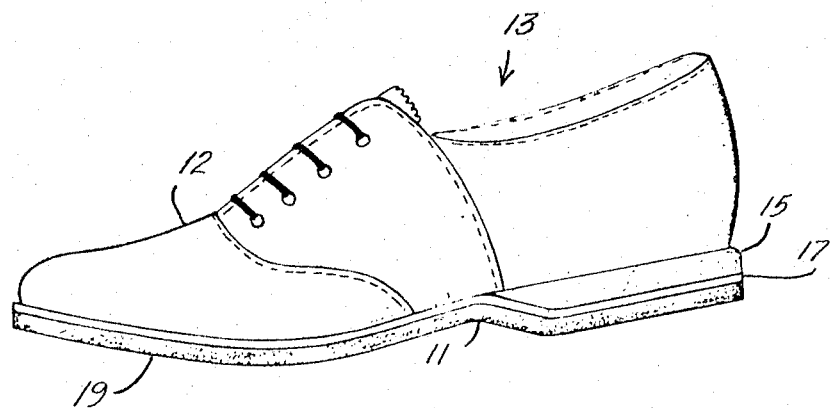
FIG. I
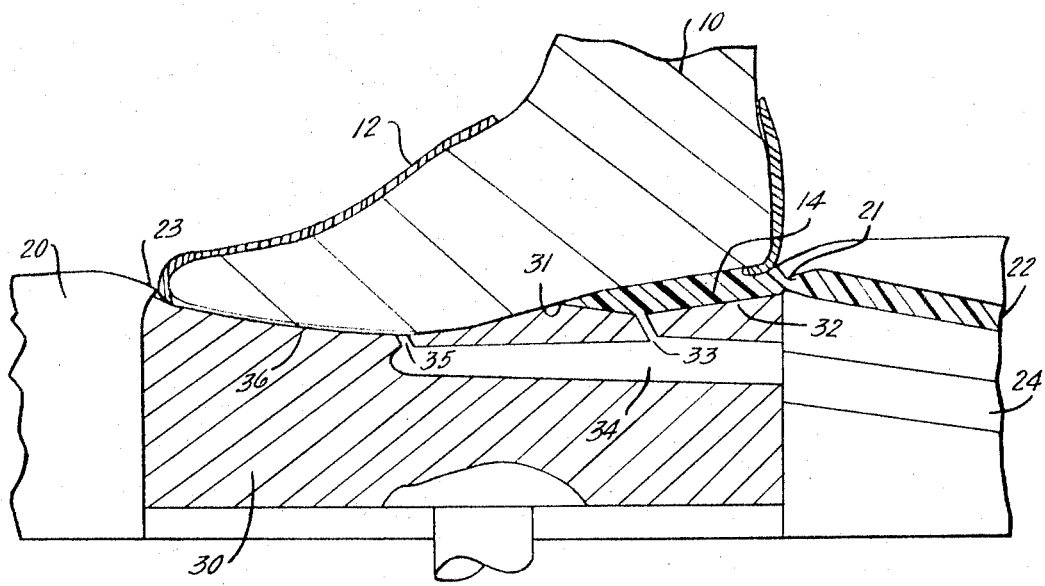
FIG. 2
INVENTOR.
JULIUS G. WINKLER
BY
ATTORNEY

United States Patent Office 3,463,849
Patented Aug. 26, 1969

---

3,463,849
METHOD OF INJECTION MOLDING FOOTWEAR
Julius G. Winkler, Lexington, Mass., assignor to Compo Shoe Machinery Corporation, Waltham, Mass.
Filed Jan. 17, 1967, Ser. No. 609,830
Int. Cl. B29c 9/00; B29f 1/12; B29h 1/08
U.S. Cl. 264—244
3 Claims

ABSTRACT OF THE DISCLOSURE

The method of injection molding wedge-heel type footwear wherein the shoe bottom is formed of multi-colored and/or different kinds of plastic and/or rubber or like materials and comprising the steps of mounting an upper on a last and bringing it into contact with an open top mold cavity having a movable bottom member provided with a built-in depression rearwardly of the heel breast line; moving the bottom member adjacent the bottom of the last so that it abuts the same forwardly of the heel breast line; injecting a first bottom forming compound directly into the cavity formed by said depression and the bottom of the last to form the wedge-heel; lowering the bottom member a distance away from the bottom of the last and injecting a second bottom forming compound of a color and/or material different from the first compound so as to form the midsole; again lowering the bottom member a still further distance away from the bottom of the last and injecting a third bottom forming compound, preferably of the same color and kind as the first compound so as to form the outsole of the footwear; allowing the injected compounds to harden and set and then, by opening the mold, stripping the finished footwear therefrom.

BACKGROUND OF THE INVENTION

Field of the invention

The present invention relates to the injection molding of shoe bottoms to footwear and, more particularly, to the injection molding of wedge-heel type footwear using multi-colored and/or different kinds of plastic or rubber or the like bottom forming compounds.

Description of the prior art

As more fully disclosed in U.S. Patent 3,276,058, granted Oct. 4, 1966, to J. A. Harrington et al., a conventional "wedge-heel type" shoe is formed by securing the heel between the shoe and the sole. The sole extends flat across the heel, bends into contact with the front surface of the heel and extends flat to the toe, with the sole being bonded by an adhesive to the heel and the shoe. Wedge-heel inserts must be breasted at an angle to provide optimum adhering conditions between the contoured sole and the heel and a good bond must be formed between the front angular breasted surface of the heel and the sole. It is further stated that even though this surface is formed at an angle, there is often considerable difficulty in effectuating a secure lasting bond between this angular surface and the overlapping sole due to the large stress tending to cause the sole to "pull away." It is further stated that in many instances a sponge rubber sole especially will "pull away" from the front breasted heel surface.

The aforementioned problem of "pulling away" in the manufacture of a conventional wedge-heel type shoe is completely avoided by the method of the present invention so that the product is at once more attractive and of more enduring constructional stability than conventionally made wedge-heel type footwear.

As to the patents of J. J. Ferreira, U.S. Patents 3,116,566, 3,175,249, 3,178,496, 3,246,068, indicate, the injection molding of shoe bottoms to footwear is now a well-known art. These patents relate to an injection process for incorporating in the tread of the shoe preformed leather sole pieces such as full soles, taps, heel lifts or other inserts. They do not relate to the injection forming of wedge-heel type footwear, nor do they disclose the molding of shoe bottoms of multi-colored materials.

SUMMARY

The invention relates to an improved method of forming, by injection molding, multi-colored shoe bottoms for wedge-heel type footwear, also referred to as footwear with spring-heel. More particularly, it relates to the forming of such footwear by a three injection method employing an open top mold cavity provided with a movable bottom member in which the bottom member is having a built-in depression rearwardly of the heel breast line so as to form, in conjunction with the bottom of a lasted upper, a first cavity to form the wedge-heel therein. Following such first injection, which is accomplished through the side ring directly into the cavity, the bottom member is lowered at a distance sufficient to create a second cavity substantially parallel to the bottom of the last and the bottom of the now formed wedge-heel and injecting, in a second operation, a bottom forming compound of different color and/or kind than the first compound so as to form the midsole, with this second injection preferably being effected through an injection passage provided in the bottom member. Then by lowering the bottom member a still further distance so as to form a third cavity between it and the now formed midsole member, injecting again through the sole plate, another bottom forming compound therein so as to form the outsole of the footwear. Preferably the compound used for forming the outsole is of the same color and/or hardness as the compound used for forming the wedge-heel. Such bottom forming materials may comprise the well known plastic compounds such as PVC or natural or synthetic rubbers or like elastomeric materials.

It is, therefore, an object of the present invention to provide an improved method of injection forming wedge-heel type shoe bottoms to shoe uppers.

It is a further object of the present invention to provide an economical method for the injection molding of wedge-heel type footwear of quality construction.

Brief description of the drawings

These and other features of the invention will be best understood and appreciated with reference to the accompanying drawings, wherein:

FIG. 1 depicts, in side elevation, a wedge-heel type footwear injection molded in accordance with and embodying the present invention;

FIG. 2 is a longitudinal section, partly in elevation, of a lasted upper and mold assembly, in a position during the first injection forming the wedge-heel;

Description of the preferred embodiment

Figure 3:
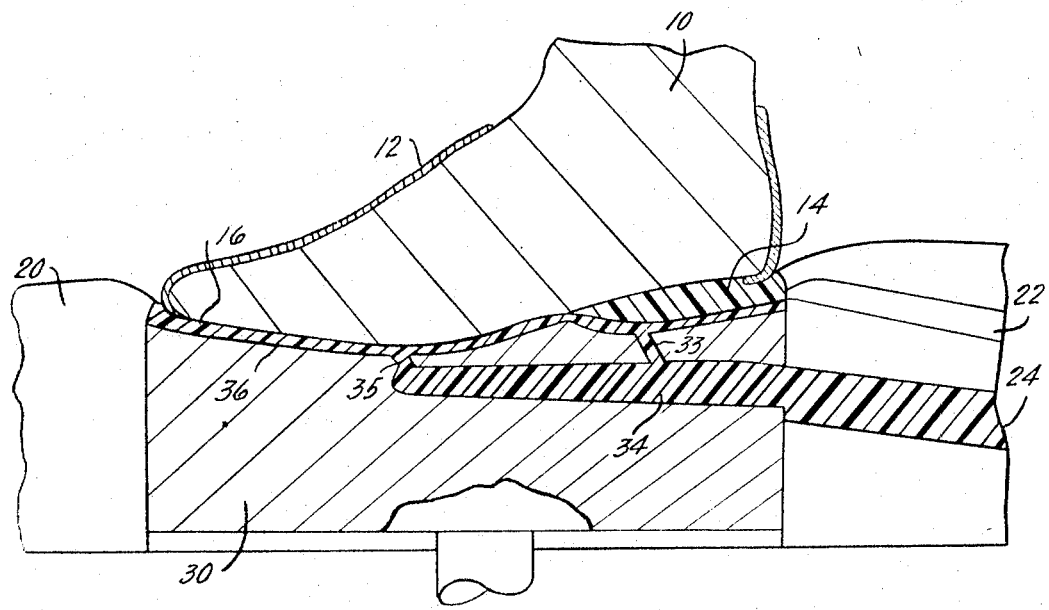
FIG. 3 is a view similar to that shown in FIG. 2, but showing the second injection for forming the midsole.

Referring to the drawings and in particular to FIG. 1, there is shown in side elevation, a finished wedge-heel type shoe 13 that was injection molded in accordance with the method of the invention. This wedge-heel type shoe 13 comprises an upper 12 to which has been injection molded a wedge-heel type bottom, consisting of a wedge heel 15, a midsole 17 and an outside 19. it is to be noted that the color of the wedge heel 15 is similar to and may be identical with the color of the outsole 19. It is also to be noted that the outsole 19 "springs" gently at an angle rearwardly of the heel breast line 11 so as to form the wedge heel of the footwear.

Figure 4:
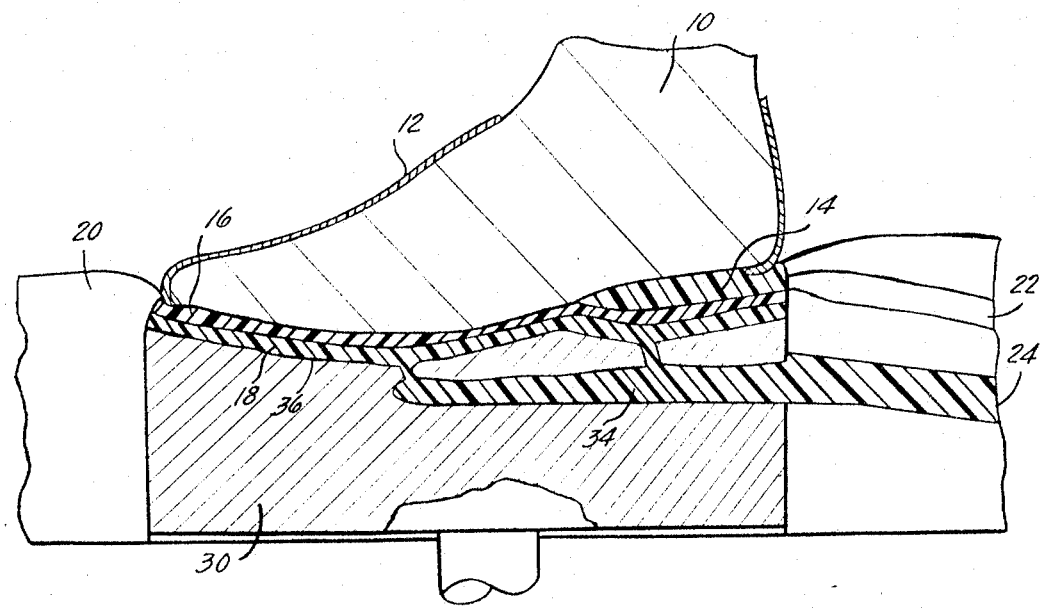
FIG. 4 is a similar view, but showing the third injection for forming the outsole of the footwear.

FIGS. 2, 3 and 4 disclose a suitable mold for making the wedge-heel type footwear and show the respective three injection steps required to accomplish the method of the invention.

As may be seen in these FIGS. 2, 3 and 4, there is shown in longitudinal section and partially in elevation, a metal last 10 on which an upper 12 has been suitably secured in known manner, such as by string lasting. The lasted upper is then positioned on the lip 23 of a conventional mold ring composed of two halves and split longitudinally, one half of which is indicated as at 20. By separating the mold hales, the finished shoe may be conveniently stripped from the last 10 after the method, as hereinafter described, has been completed. The mold ring is preferably provided with two injection passages 22 and 24 arranged at the interfaces of the mold halves so that one half of each passage is actually formed in each of the mold halves. Injection passage 22 is being provided for the first injection and it communicates directly with the mold cavity as will be more fully adverted to below. Injection passage 24, on the other hand, is intended to serve for the second and third injections and does not directly communicate with the mold cavity. A suitable bottom member such as sole plate 30 completes the operative mold parts. It is to be noted that sole plate 30 is vertically movable within the mold rings, as is already well known, with the movement of the sole plate being effected by hydraulic or fluid means. The sole plate 30 is provided with a bottom forming surface 36 whose shape and contour will determine the final shape and contour of the tread surface of the finished shoe 13.

Furthermore, it must be pointed out that this upper surface 36 of the sole plate is provided with a built-in depression 32 rearwardly of the heel breast line 31. It is pointed out that the shaping of this heel breast line 31 is important since it must serve as an effective seal with the bottom of the last 10 so as to prevent the entry of bottom forming compound during the first injection forwardly of this heel breast line 31.

The first injection passage 22 is provided with a constricted portion 21 at the interface of the mold ring with the sole plate 30 and as may be observed, communicates directly into the cavity as defined by the heel breast line 31, the depression 32 and the bottom of the last 10 at the heel portion thereof. The sole plate 30 is also provided with an injection passage 34 running longitudinally through the sole plate substantially at the median line thereof and at a distance below its upper surface 36. This injection passage 34 is provided with at least two orifices 33 and 35 which are communicating with the mold cavity. Furthermore, the injection passage 34 should be so formed as to permit the injection for the second and third shot through the injection passage 24 in the mold ring and also to permit the operator to remove the sprue therefrom following the completion of the second injection process.

As shown in FIG. 2, the sole plate 30 is in its uppermost position so that its upper surface 36 forwardly of the heel breast line 31 closely abuts the bottom of the last 10. In this position of the sole plate 30, the first injection takes place through the injection passage 22 until it completely fills the first cavity 14 formed rearwardly of the heel breast line 31 and defined by the built-in depression 32 of the sole plate at one side and by the bottom of the last 10 in the heel area thereof from the other side. This first injection of a suitable bottom forming material, such as plastic or rubber, will form the wedge heel 15 of the finished shoe 13.

Following completion of the first injection and after the same has been allowed to harden a sufficient degree, the sole plate 30 is lowered a distance away from the bottom of the last 10 so as to form a second cavity 16 wherein will be formed, the midsole of the footwear during the second injection, as may be best observed with reference to FIG. 3. It should be noted that the injection passage 34 of the sole plate 30 is in at least partial register with the injection passage 24 of the mold ring, thus a second bottom forming compound may be conveniently injected through the passages 24 and 34 whence it will enter the second mold cavity 16 through the orifices 33 and 35. Preferably, the bottom forming compound to form the midsole is of a different color and material than that which was used during the first injection.

Following the completion of the second injection, and the lapse of a time sufficient to permit the same to become set, the sprue is removed from the injection passages 24 and 34. Thereafter, the sole plate 30 is lowered once again a still further distance away from the bottom of the last 10 so as to define a third cavity 18 between the upper surface 36 of the sole plate 30 and the midsole formed during the second injection. It must again be pointed out that the injection passage 34 is once again in partial register with the injection passage 24 of the mold ring. The third injection is now effected so as to form the outsole of the footwear, as depicted in FIG. 4. Preferably the bottom forming compound used for the third injection is of the same color and material as that used for the first injection to form the wedge heel.

Following the completion of the third injection and after the expiration of a time sufficient for allowing it to set and harden, the mold halves are opened and the now finished injection molded footwear 13 is stripped from the last 10.

What is claimed is:

1. The method of injection molding footwear comprising bringing a lasted upper into contact with an open top mold cavity provided with a movable sole plate, said sole plate having a built-in depression rearwardly of the heel breast line so as to form a first injection cavity when said sole plate is pressed against the bottom of said lasted upper; moving the sole plate in abutting relation with the bottom of the lasted upper forwardly of the heel breast line and injecting a first bottom forming compound rearwardly thereof into said first injection cavity; lowering the sole plate a distance away from the bottom of the last and injecting a second bottom forming compound along the entire length of the bottom of the last; lowering the sole plate a still further distance away from the bottom of the last and injecting another bottom forming compound along the entire length of the bottom of the last; and stripping the finished footwear from the mold.

2. The method of injection molding footwear with multicolored shoe bottom comprising positioning a lasted upper on an open top mold having a movable sole plate provided with a built-in depression rearwardly of the heel breast line so as to form a first injection cavity when said sole plate is pressed against the bottom of said lasted upper; injecting a first bottom forming compound into said first injection cavity so as to form a wedge-heel; lowering said sole plate a distance away from the bottom of the last and injecting a second bottom forming compound along the entire length of the bottom of the last so as to form the midsole; and lowering said sole plate a still further distance and injecting a bottom forming compound of the same kind and color as said first compound and along the entire length of the bottom of the last, so as to form the outsole.

3. The triple injection method of molding wedge-heel type bottoms to footwear comprising string lasting an upper on a metal last and bringing it into contact with an open top mold cavity having a movable bottom member provided with a built-in depression rearwardly of the heel breast line, said depression together with the bottom of the lasted upper forming a first injection cavity when said sole plate is pressed against said bottom; moving said bottom member into abutting relation with the bottom of said last forwardly of said heel breast line and injecting a first bottom forming compound into said first injection cavity rearwardly of said heel breast line so as to form the wedge-heel; lowering said bottom member a distance away from the bottom of said last so as to form a second cavity substantially parallel to and along the entire length of the bottom of said last and injecting a second bottom forming compound of a color and kind different from said first compound so as to form the midsole; again lowering said bottom member a still further distance away from the bottom of said last so as to form a third cavity substantially parallel to and along the entire length of said midsole and injecting a third bottom forming compound of a color and kind similar to said first compound into this third cavity so as to form the outsole; allowing said bottom forming compounds to harden and then stripping the finished footwear from the mold.

References Cited

UNITED STATES PATENTS

| | | | |
|---|---|---|---|
| 3,319,301 | 5/1967 | Ludwig | 264—244 |
| 3,363,039 | 1/1968 | Nagai et al. | 264—245 |

ROBERT F. WHITE, Primary Examiner

R. SHEAR, Assistant Examiner

U.S. Cl. X.R.

18—30, 42; 264—245